(No Model.)

T. A. BROWN.
TEA OR COFFEE POT.

No. 285,731. Patented Sept. 25, 1883.

Witnesses.
Will C. Omohundro.
Frank C. Doty.

Inventor.
T. A. Brown
By Oliver W. Wilson
Atty.

UNITED STATES PATENT OFFICE.

TILGHMAN A. BROWN, OF WORTHINGTON, INDIANA.

TEA OR COFFEE POT.

SPECIFICATION forming part of Letters Patent No. 285,731, dated September 25, 1883.

Application filed February 6, 1882. (No model.)

*To all whom it may concern:*

Be it known that I, TILGHMAN ALEXANDER BROWN, of Worthington, in the county of Greene and State of Indiana, have invented certain new and useful Improvements in Tea or Coffee Pots; and I do hereby declare the following to be a full, clear, and exact description of the invention, such as will enable others skilled in the art to which it pertains to make and use it, reference being had to the accompanying drawings, which form part of this specification.

My invention relates to an improvement in tea or coffee pots; and it consists in forming an air-chamber which is open at its lower end, and communicates with the inside of the top of the pot at its upper end, and which serves to allow cold air to pass into the pot for the purpose of condensing the steam and vapor and preventing escape of aroma that may be therein, and to keep the handle cool.

It further consists in turning downward the flange around the lower end of the pot, so as to prevent the bottom of the pot from coming in contact with the stove, as will be more fully described hereinafter.

Figure 1:
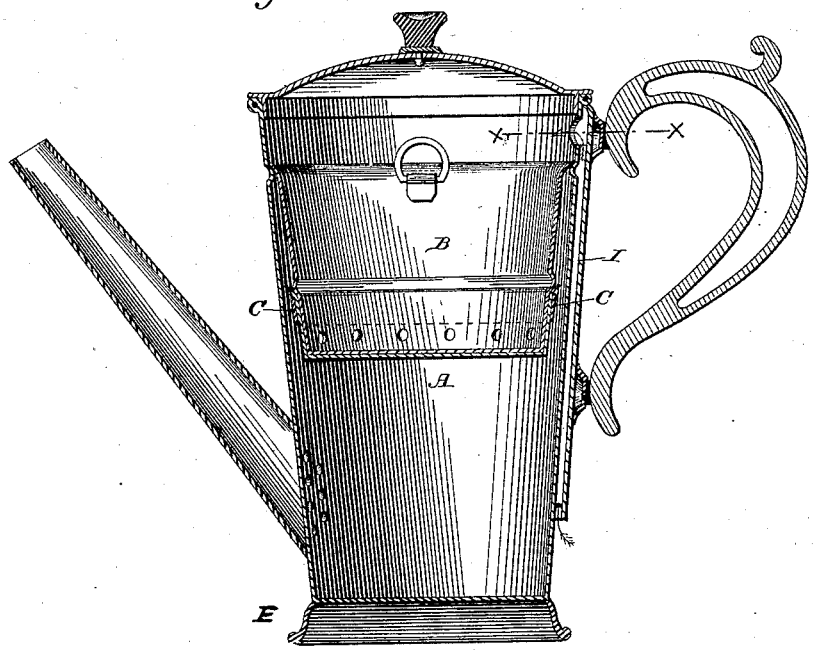
Figure 2:
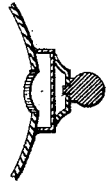

Figure 1 of the accompanying drawings represents a vertical section of my invention. Fig. 2 is a section on line *x x* of Fig. 1.

A represents a tea or coffee pot of any desired shape or size, and B is the vessel in which the ground coffee or the tea-leaves are placed. The bottom and the sides of this vessel are perforated, as shown, and over the bottom and sides of this perforated part is passed a cloth, which acts as a strainer, and which cloth is held in position by means of the ring or band C. Where this vessel is used in a tea-pot, the straining-cloth will be much finer than in one which is used in a coffee-pot. The upper edge of this vessel is turned outward, so as to form a flange, and the side of the pot has a corresponding groove or indentation, upon which this flange rests. To the inner side of this perforated vessel are secured the two rings which act as handles. The flange E upon the lower edge of the pot is turned downward, as shown, so as to form a hot-air chamber under the bottom of the pot, and thus prevent it from coming in contact with the stove.

Secured to the outside of the pot, where the handle is fastened on, is a flat tube, I, which is opened at its lower end, and which communicates through an opening with the under side (or lid) of the pot at its top. Through this flat tube, to which the handle is secured, passes a current of cold air, which serves to condense the steam and vapor (and prevent escape of aroma) in the pot, but at the same time to allow the steam to escape when the pot is set on the stove and when the steam is being generated too rapidly for safety. This tube also serves to keep the handle constantly cool by allowing a volume of air to always rest in between the ends of the handle and the pot. As long as this outside tube is used, the handle can never become unpleasantly warm. This tube must necessarily communicate with the inside of the pot at its upper end, it being desired to keep the handle cool, and more particularly to supply a constant circulation or stream of cold air, for the purposes hereinbefore named.

Having thus described my invention, I claim—

1. In combination with a tea or coffee pot, an outside tube which is open to the outer air at its lower end, and at its upper end communicates with the interior chamber, and to which tube the handle is secured, substantially as shown.

2. A coffee-pot provided with an air-inlet tube arranged, substantially as shown, between the body of the pot and its handles, whereby the latter are kept cool and the escape of steam and aroma prevented.

3. The handle secured to the flat tube or trough I, substantially as set forth.

In testimony that I claim the foregoing I have hereunto set my hand this 20th day of June, A. D. 1881.

TILGHMAN A. BROWN.

Attest:
OLIVER M. WILSON,
JAMES GRIMSBY.

Correction in Letters Patent No. 285,731.

It is hereby certified that Letters Patent No. 285,731, granted September 25, 1883, upon the application of Tilghman A. Brown, of Worthington, Indiana, for an improvement in "Tea or Coffee Pots," should have been issued to the said Tilghman A. Brown *and Oliver M. Wilson*, assignee of one-third interest in said invention; that the correction has been made in the files and records of the case in the Patent Office, and should be read in the patent to make it conform thereto.

Signed, countersigned, and sealed this 20th day of November, A. D. 1883.

[SEAL.]

M. L. JOSLYN,
*Acting Secretary of the Interior.*

Countersigned:
BENJ. BUTTERWORTH,
*Commissioner of Patents.*